3,192,035
METHOD FOR DAMMING THE MOUTH OF TILTING FURNACES

Nils Harald Jonsson, Oxelosund, Sweden, assignor, by mesne assignments, to Stora Kopparbergs Bergslags Aktiebolag, Falun, Sweden, a corporation of Sweden
No Drawing. Filed Apr. 22, 1963, Ser. No. 274,780
Claims priority, application Sweden, Apr. 26, 1962, 4,687/62
2 Claims. (Cl. 75—28)

In connection with adding alloying elements to steel in the ladle or launder, it was found disadvantageous that the steel furnace slag follows with the steel down into the ladle, at least during an early phase of the tapping. The said disadvantage is due to the ample oxide content of the steel furnace slag, consisting substantially of iron oxides which are of oxidizing effect on readily oxidizing alloying elements such as silicium and manganese. A slag layer covering the steel in the ladle, moreover, prevents the alloying elements from penetrating down into the steel or renders such penetration difficult. There is, furthermore, the risk of re-reduction of impurities, such as phosphorous taken up by the slag in the steel furnace. Finally, it is of advantage to retain the slag in the steel furnace, so that it can be used in the next cycle, which results in the saving of slag formers and iron.

For this reason, when heretofore tilting metallurgical furnaces tapped over the lip were tapped, burnt lime was placed in the mouth of the furnace for damming up the slag and, thus, to prevent it from following with the steel down into the ladle. In order to improve the damming effect thus obtained, wooden poles were stuck down through the burnt lime whereby "cooking" was effected causing the slag and possibly even part of the steel to penetrate upwards into the layer of burnt lime. By their contact with the burnt lime of lower temperature, the slag and steel solidified and acted as "reinforcement" of said lime. When thereafter the furnace was tapped, the damming thus obtained prevented the slag from following with the steel down into the ladle.

With increasing dimensions of the furnaces, however, the aforesaid damming proved not sufficiently strong to retain the slag in the furnace, partly due to the higher slag pressure and partly to the wider mouth of the furnace. This invention relates to a method for damming the mouth of tilting furnaces tapped over the lip and has as its object to solve this problem. The invention is substantially characterized in that prior to the tapping carbonate is inserted in the mouth in order to stiffen the slag cover and that the metal, for example the steel, is tapped below the damming thus produced. Preferably, a depressing agent is placed above the stiffened slag cover, which agent also contributes to fixing the damming to the furnace walls. Burnt lime, burnt dolomite, steel furnace slag, limestone, dolomite stone or the like have proved to be suitable depressing agents.

The carbonate or carbonates to be used for damming the slag should preferably be of the type dissociating at high temperatures. Carbonates of earth type metals have proved specially suitable, for example lime stone and dolomite stone or the like, adapted to be utilized as slag formers in the subsequent steel manufacture. It should be observed that there is a special advantage involved in using and retaining such material, because otherwise they would nevertheless have been added as slag formers at the beginning of the next charging period.

The amount of carbonates to be used for achieving the desired effect depends on the size and the construction of the furnace. It is, therefore, not possible to give any critical threshold values for the amount required. By experience it may be said, that the order of magnitude lies within the range from 0.2 to 2.0 percent of carbonate per ton of steel.

The following example illustrates how the method according to the invention may be carried out. A Kaldo-furnace containing 100 tons of pre-deoxidized steel with 0.09% C. was to be tapped. The furnace was tilted into almost horizontal position, and a charging machine charged 800 kg. of lime stone into the mouth above the steel bath and slag cover. After the reaction was finished (dissociation of $CaCO_3$, penetration of slag and steel into the lime layer) a stiff cake was observed on the bath surface. In order to improve the strength of the bridge-like damming still more, about 1000 kg. of burnt lime were charged, specially at the edges. The burnt lime had as its object to press down the previously obtained damming as well as to fix it to the furnace walls.

The Kaldo-furnace was then tapped by tilting it by some small additional angle. The jet was free of slag. At the same time, the necessary amount of ferromanganese and also of aluminium (for deoxidizing) was added to the ladle. After the tapping was completed, a smaller amount of pulverized blast furnace slag (low FeO-content) was added to the ladle in order to protect the steel against the effect of air.

A steel with good yield and uniform distribution of the alloying elements was obtained.

What I claim is:

1. In the tapping of molten steel from a tilting furnace in which the molten steel is associated with slag, which molten steel is tapped over the lip of the furnace, the improvement which consists in retarding discharge of the slag with the molten steel by prefacing the tapping operation by adding an earth metal carbonate material selected from the group consisting of limestone and dolomite, onto the molten material contained in the furnace, then adding, above the resulting stiffened slag cover, an agent selected from the group consisting of burnt lime, burnt dolomite and steel furnace slag, whereby to strengthen the stiffened slag cover and to fix the latter to the furnace walls, and tapping the molten steel from beneath said stiffened slag cover.

2. A method according to claim 1, characterized in that per ton of steel in the furnace 0.2 to 2 percent by weight of carbonate is added.

References Cited by the Examiner

"Refining Metals Electrically," Larry J. Barton, published by the Penton Publishing Company, Cleveland, Ohio, 1926, pages 131–140.

"Basic Open Hearth Steel Making," 2d edition, published by the American Institute of Mining and Metallurgical Engineers, New York, 1951, pages 296 and 297.

DAVID L. RECK, *Primary Examiner.*

WINSTON A. DOUGLAS, *Examiner.*